April 23, 1963 P. N. BRAUN ET AL 3,086,429
ERROR-PROOF GARMENT MARKING MACHINE
Filed Jan. 30, 1961 4 Sheets-Sheet 1
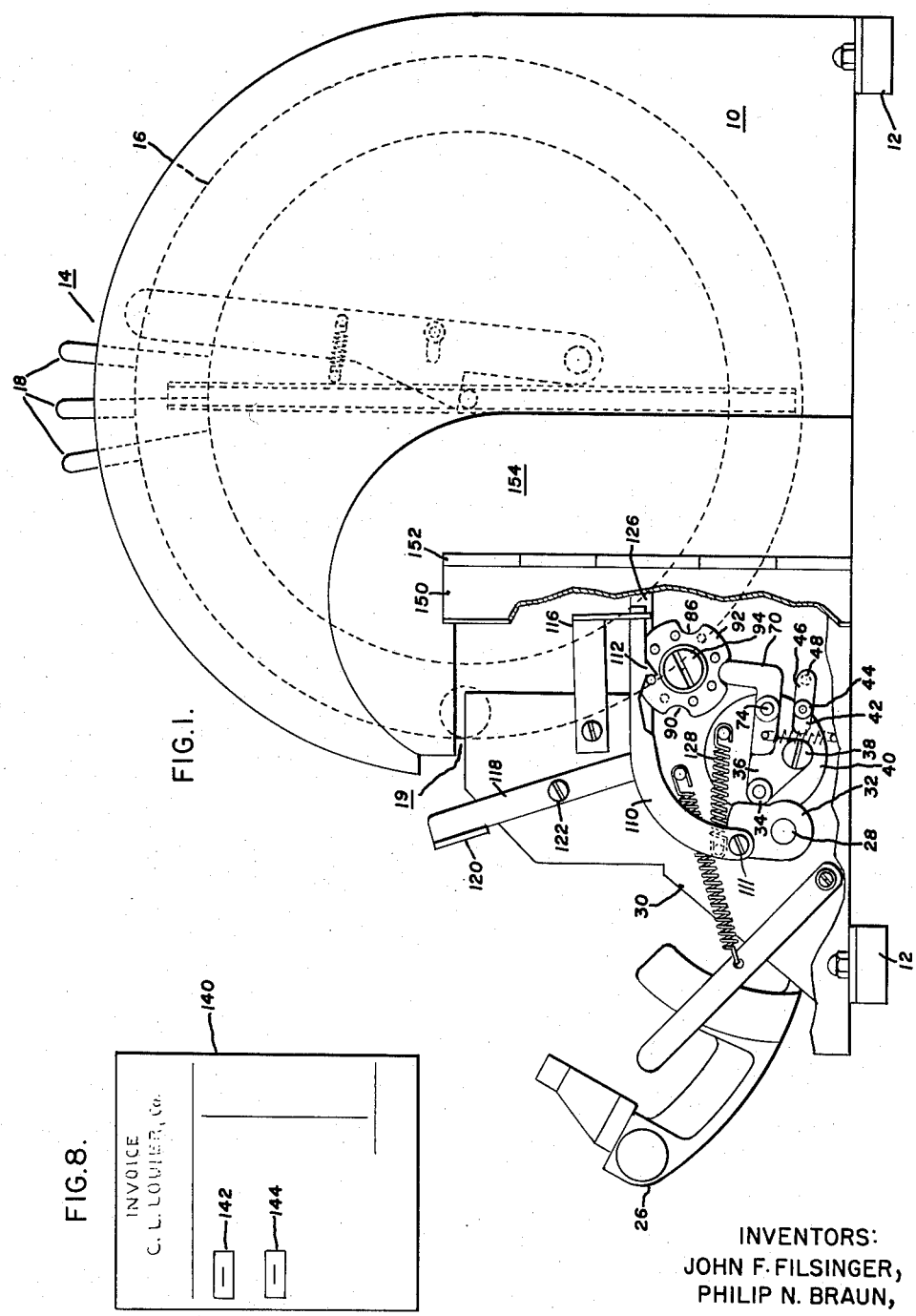
INVENTORS:
JOHN F. FILSINGER,
PHILIP N. BRAUN,
BY D. Emmett Thompson
THEIR ATTORNEY.

April 23, 1963 P. N. BRAUN ET AL 3,086,429
ERROR-PROOF GARMENT MARKING MACHINE
Filed Jan. 30, 1961 4 Sheets-Sheet 2
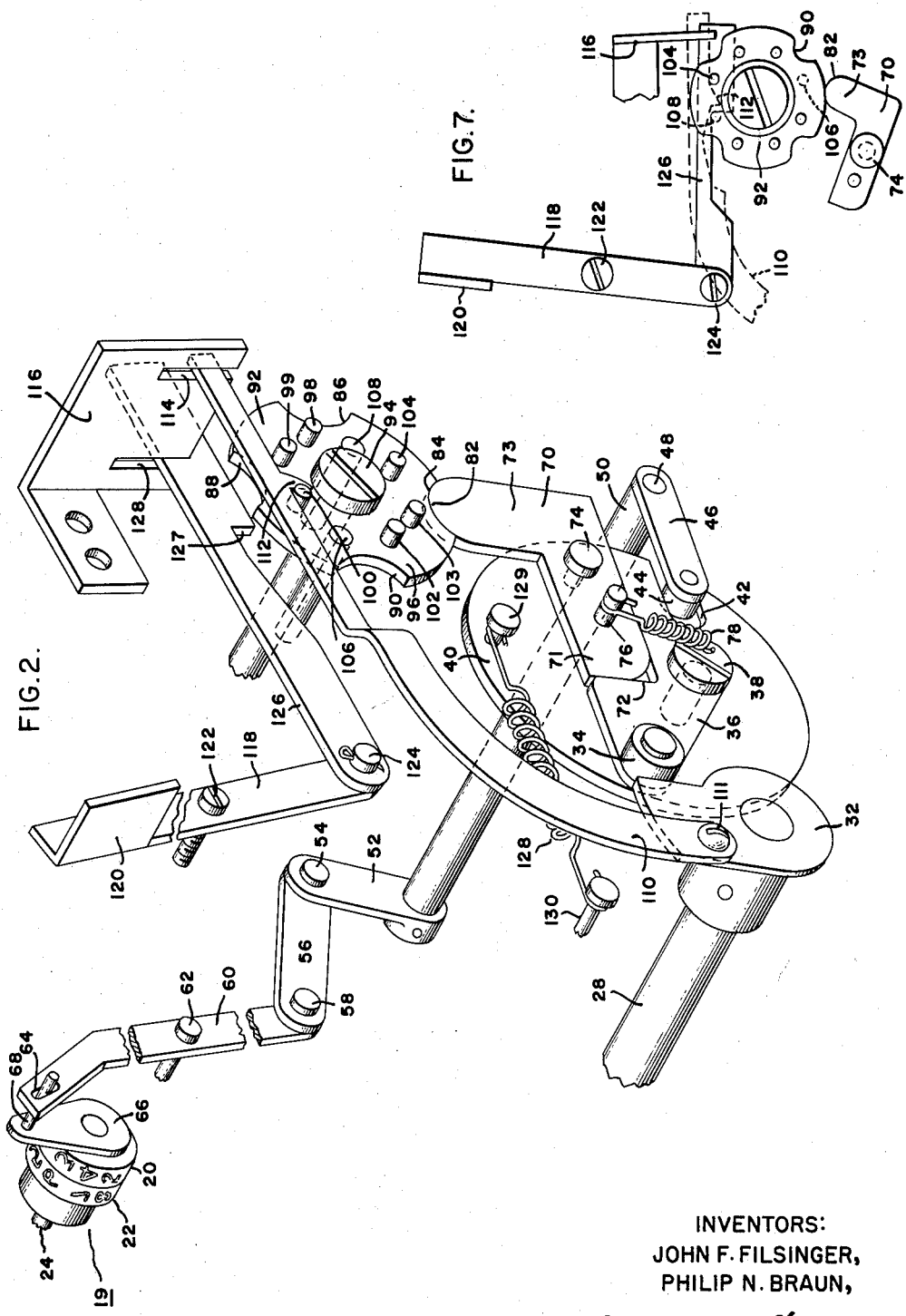
INVENTORS:
JOHN F. FILSINGER,
PHILIP N. BRAUN,
BY D. Emmett Thompson
HIS ATTORNEY.

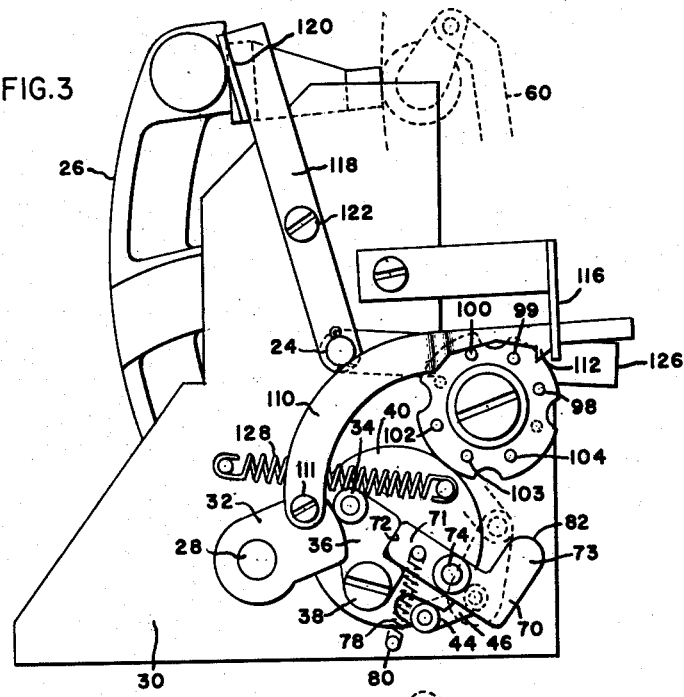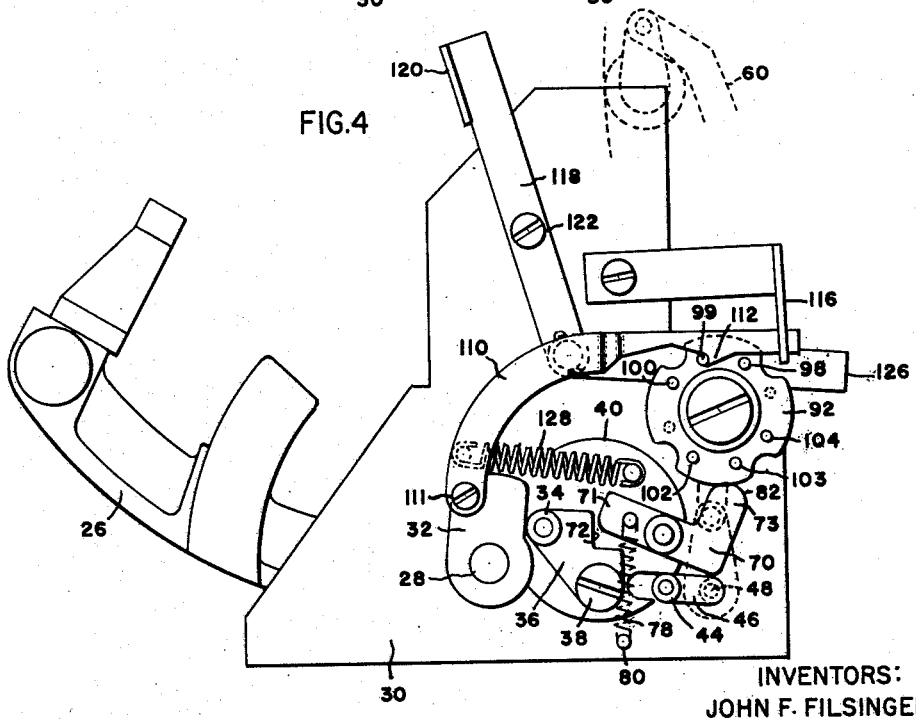

April 23, 1963  P. N. BRAUN ET AL  3,086,429
ERROR-PROOF GARMENT MARKING MACHINE
Filed Jan. 30, 1961  4 Sheets-Sheet 4

INVENTORS:
JOHN F. FILSINGER,
PHILIP N. BRAUN,

BY *D. Emmett Thompson*
THEIR ATTORNEY.

United States Patent Office 3,086,429
Patented Apr. 23, 1963

3,086,429
ERROR-PROOF GARMENT MARKING MACHINE
Philip N. Braun and John F. Filsinger, Syracuse, N.Y., assignors to Tag-O-Matic Machine Co., Inc., Syracuse, N.Y., a corporation of New York
Filed Jan. 30, 1961, Ser. No. 85,802
1 Claim. (Cl. 93—88)

This invention relates to a garment marking machine which operates to affix identification indicia by heat sealing, stapling, or the like, to garments which are to be processed, as by laundering or dry cleaning. The garments are marked in order that they may be processed in a batch with garments of other customers and so that upon completion of the processing, the garments for each customer may be segregated from the batch and collected together for delivery to the customer. An invoice is commonly used to list the garments belonging to an individual customer and to record the prices for the processing operation whether it be laundry or dry cleaning.

In certain processing establishments, a system has developed wherein the invoice on which the garments of an individual customer are listed is provided with the first and last identification tag in order to permit the processed garments to be quickly and accurately collected upon completion of the processing. For example, if there are four garments of an individual customer to be processed, the first garment is marked with a tag bearing a first identification number. A second tag bearing the same identification number is then affixed to the invoice. Thereafter three additional consecutive numbers are printed on three additional tags, one each of which is affixed to each of the remaining three garments. A final tag bearing the same identification number as the last consecutive number applied to the tag affixed to the garment is then affixed to the invoice. Accordingly, the invoice bears two identification tags, one of which has a number corresponding to the first number imprinted on the tag affixed to the first garment, and the other of which bears a number corresponding to the number on the tag affixed to the last garment whereby a worker will know that all of the garments bearing the intermediate consecutive numbers are part of the same order.

It is a general object of this invention to provide a garment marking machine which will permit the errorless marking of the invoice and garments in accordance with the above referred to system.

More specifically, it is an object of this invention to provide a garment marking machine which will permit two tags to be imprinted with the same identification indicia, a plurality of tags to be imprinted with consecutive identification indicia and two final tags to be imprinted with the same identification indicia.

The invention consists in the novel features and in the combinations and construction hereinafter set forth and claimed.

In describing this invention, reference is had to the accompanying drawings in which like characters designate corresponding parts in all the views.

In the drawings—

FIGURE 1 is a side elevational view of a preferred embodiment of the invention with parts omitted and parts broken away for purposes of clarity.

FIGURE 2 is a perspective view of a portion of the operating mechanism shown in the starting position.

Figure 5:
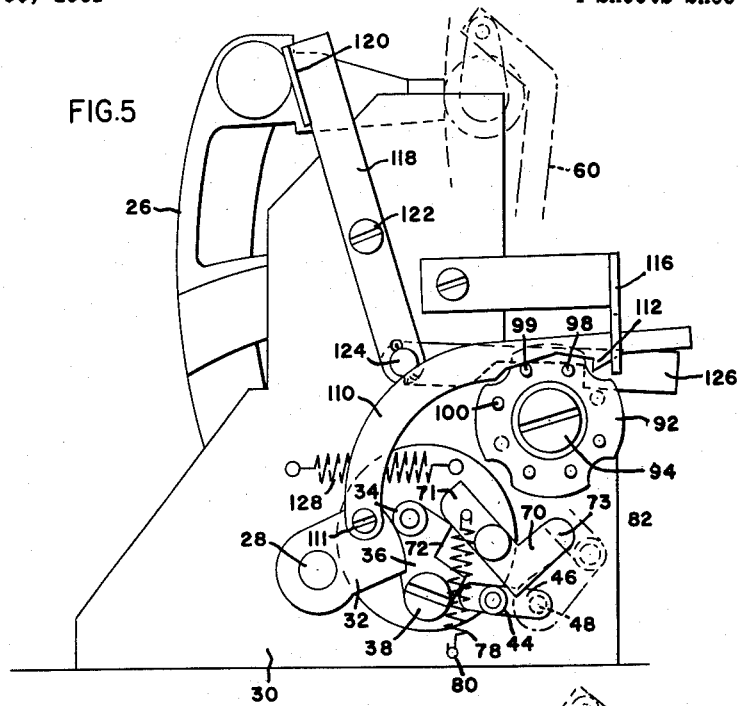

FIGURES 3, 4, 5, and 6 are fragmentary side elevational views of the mechanism shown in FIGURE 2 wherein each view shows a successive position of an operating mechanism.

FIGURE 7 is a fragmentary side elevational view of a portion of the operating mechanism, and FIGURE 8 is a schematic illustration of an invoice provided with a pair of identification tags.

In prior patents, No. 2,742,828, issued April 24, 1956, and No. 2,825,480, issued March 4, 1958, garment marking machines of the type which staple the identification indicia to the garment and heat seal the identification indicia to the garment, respectively, are more particularly disclosed. Either of the machines disclosed in those patents may be provided with the arrangement comprising the subject matter of this application.

In FIGURE 1, a garment marking machine of either type above referred to, is shown and includes a housing having a side wall 10, a plurality of supporting feet 12, and a type wheel segment assembly, generally indicated by the reference numeral 14. This assembly may be of the type more particularly disclosed in Patent No. 2,598,438, issued May 27, 1952, and includes a plurality of type segment wheels, one of which is indicated by the dashed lines 16, each of the wheels having a handle 18 manipulable to form a portion of a print line for printing the tags to be affixed to the garments with identification indicia.

The type segment wheels 16 form a portion of the identification indicia, the remainder of which is formed by a counter-mechanism, generally indicated at 19, and including a pair of type wheels 20 and 22 mounted on a shaft 24 (see FIGURE 2). The wheels 20 and 22 are rotated through the structure, to be hereinafter described, so as to consecutively print tags for affixing to the garments and invoice in accordance with the system previously described. As shown in FIGURE 2, the wheels 20 and 22 are for this purpose formed with a plurality of raised type figures which may be numerals, letters, or the like.

The machine includes a garment supporting arm 26 which is affixed to a main shaft for oscillating movement toward and from a tag affixing station whereby when a garment is draped over the arm 26 and the arm is moved to the tag affixing station, a printed tag is affixed to the garments. This portion of the machine may be identical to that described in either Patent No. 2,742,828 or No. 2,825,480.

As seen in FIGURE 1, the arm 26 is mounted within the side wall 30 of a frame in which the tag affixing mechanism, which may take the form of either a heating iron or a stapler, for example, is carried. Referring to FIGURE 2, the shaft 28 extends outwardly through the side wall 30 and is provided with a cam arm 32 which is affixed to the shaft 28 for oscillation therewith. The cam member 32 is positioned to engage a roller 34 carried by a notched arm 36. The arm 36 is pivotally mounted on a pin 38 which is affixed to the side wall 30 of the frame. A wheel 40 is also pivotally mounted on the pin 38 intermediate the arm 36 and the side wall 30. The wheel 40 is provided with a slot 42 in which a roller 44, journalled on an arm or link 46, is received. The opposite end of the arm 46 is affixed, as at 48, to a shaft 50 which is journalled for oscillation in the frame and the shaft 50 is provided intermediate its ends with an arm 52 fixedly mounted thereon. The outer end of the arm 52 is pivotally connected as at 54 to a link 56 which is pivotally connected at its opposite end, as at 58, to an actuating arm 60. The arm 60 is pivotally mounted intermediate its ends as at 62 and is formed at its upper end with a slot 64.

The counter-mechanism 19 is provided with an indexing member 66 having an outwardly extending pin 68 received in the slot 64 formed at the upper end of the arm 60, all whereby when the shaft 50 is partially rotated in a counterclockwise direction, as viewed in FIGURE 1, the actuator 66 is oscillated to move the type wheel 20 forwardly one position, thereby forming in conjunction with the type wheel 22 and the type segment wheels 16, a next consecutive identification number or indicia. The counter-mechanism is of the commercially available type and operates in the manner which allows the wheel 20 to move through successive positions, after which, the wheel 22 is moved to a next position in order to provide identification indicia which may be consecutively increased, thereby giving a range of identification numbers of 1 to 99.

The wheel 40 carries an L-shaped arm 70 having a leg 71, the outer end of which is normally received in the right angle notch 72 formed in the arm 36. The arm 70 is pivotally mounted, as at 74, to the wheel 40 and is provided with a pin 76 to which one end of a tension spring 78 is affixed. The opposite end of the spring 78 is affixed to a pin 80 mounted on the side wall 30 of the frame whereby the arm 70 is yieldably biased to a position wherein the outer end of leg 71 is received in the notch 72. The upper end of the leg 73 of the arm 70 terminates in an arcuate portion 82 which is normally received in one of a plurality of arcuate notches 84, 86, 88, and 90, formed on the periphery of a wheel 92. The wheel 92 is pivotally mounted as by means of the pin 94 and is formed on its outer surface 96 with two groups of three pins, the first group of pins being identified by the reference numerals 98 to 100, while the second group of pins are identified by reference numerals 102 to 104, inclusive. The rearward surface of the wheel 92 is provided with a pair of diametrically spaced apart pins 106 and 108, all for a purpose to be hereinafter described. The cam member 32 has an arcuately shaped arm 110 pivotally mounted thereon as at 111 and the arm 110 extends upwardly and rearwardly and is formed with a hook 112 positioned to engage the pins 98 to 104, inclusive, and the rearward end of the arm 110 is received in a slot 114 formed in a bracket 116 mounted by any suitable manner in the machine.

The slot 114 serves to guide the reciprocatory movement of the end of the arm 110. An invoice lever 118 having an actuating surface 120 formed at its outer end is pivotally mounted as at 122 on the side wall 30 of the frame. The lower end of the arm 118 is pivotally connected as at 124 to an arm 126 which extends rearwardly through a second slot 128 formed in the bracket 116 which slot serves to guide the reciprocatory movement of the arm 126. The arm 126 is formed on its underside with a notch 127 positioned to engage the pins 106 and 108 projecting from the rearward surface of the wheel 92.

The wheel 40 is normally urged to the position shown in FIGURES 1 and 2 by means of a tension spring 128 which is connected at one end to the pin 129 carried by the wheel 40 and at its opposite end to a pin 130 fixedly mounted on the side wall of the frame 30. As will be obvious, the wheel 40, notched arm 36, and L-shaped arm 70 form what may be termed "interconnecting means" operable to effect a partial rotation of the wheel 40 when the garment arm 26 is moved upwardly into engagement with the tag affixing means.

In like manner the invoice arm 118, arm 126 and wheel 92 form what may be termed "release means" which operates when actuated to disengage the arcuate upper end 82 of the leg 73 of arm 70 from the notches 82 to 90, inclusive, formed in the wheel 92. When either of the pins 106 or 108 are engaged by the movement of arm 126, this causes a partial rotation of the wheel 92 to the position shown in FIGURE 4, for example, wherein the outer end of the leg 71 of the arm 70 is disengaged from the notch 72 in the arm 36. In this position when the cam arm 32 bears against the roller 34 to oscillate the arm 36, the arm 36 will move from the position shown in FIGURE 4 to that shown in FIGURE 5, but since the connection between the arm 36 and the arm 70 has been broken and because of the spring 128, the wheel 40 will not be rotated, and consequently, the type wheel 20 will not be advanced. Therefore, as will be obvious, the operation of the release means functions to disengage the interconnecting means between the garment arm 26 and the type wheels 20 and 22 so as to permit two successive tags to be imprinted with the same identification indicia.

Operation

With the mechanism in the starting position shown in FIGURES 1 and 2 wherein the hook 112 on the arm 110 is positioned to engage the first pin 100 of the first group of three pins, and the notch 127 in the arm 126 positioned so that neither of the pins 106 or 108 are engaged, an invoice 140, such as is shown in FIGURE 8, for example, is placed over the surface 120 of the arm 118 which then is moved to the right (FIGURE 1) to move the invoice over the tag affixing station. Movement of the garment arm serves to oscillate the cam arm 32 which through the interconnecting means previously described and comprising notched arm 36, L-shaped arm 70, wheel 40, roller 44, link 46, shaft 50, arm 52, link 56, and arm 60, serves to advance type wheel 20 one position. Continued upward movement of the garment arm 26, will, as described in the above referred to patents, cause the tape to be fed to the printing station where the tag forming portion of the tape is then imprinted with the new identification indicia, and from thence to the tag affixing station where the imprinted portion, forming a tag 142, is first affixed to the invoice 140, and then severed from the tape.

FIGURE 3 shows the garment arm 26 at its uppermost position and illustrates the oscillation of the wheel 40 which, as just described, advances the counter-wheel 20. The movement of the cam arm 32 serves to advance the hook 112 on the arcuately shaped arm 110 past the pin 100 and into a position to engage the second pin 99 on the return stroke of the arm 110.

FIGURE 4 illustrates the arm 26 fully returned to the rest position and as shown therein, the hook 112 on the arm 110 has engaged the pin 99 to partially rotate the wheel 92 in a counter-clockwise direction whereby the arcuate end 82 of leg 73 of the L-shaped arm 70 has become disengaged from the arcuately shaped notch 84, and the wheel 92 has moved the arm 70 against the spring 78 to the position shown in FIGURE 4. The machine is now in the position to commence the marking of the garments of an individual bundle listed on the invoice accompanying the bundle. The first garment is placed over the arm 26 and the arm is moved upwardly in the manner previously described to affix a tag bearing the identification indicia to the garment. However, by virtue of the fact that the outer end of the leg 71 of the arm 70 has been disengaged from the notch 72 formed in the arm 36, the movement of the garment arm 26, which is imparted to the notched arm 36 by virtue of the cam arm 32, will move the arm 36 to the position shown in FIGURE 5, and as previously described, since the arm 36 is no longer in driving engagement with the arm 70, the wheel 40, which is yieldably urged in a counter-clockwise direction by the spring 128, will not move, and hence, the type wheel 20 will not move during this operation whereby the tag affixed to the first garment will bear the same identification indicia as the tag 142 affixed to invoice 140.

Figure 6:
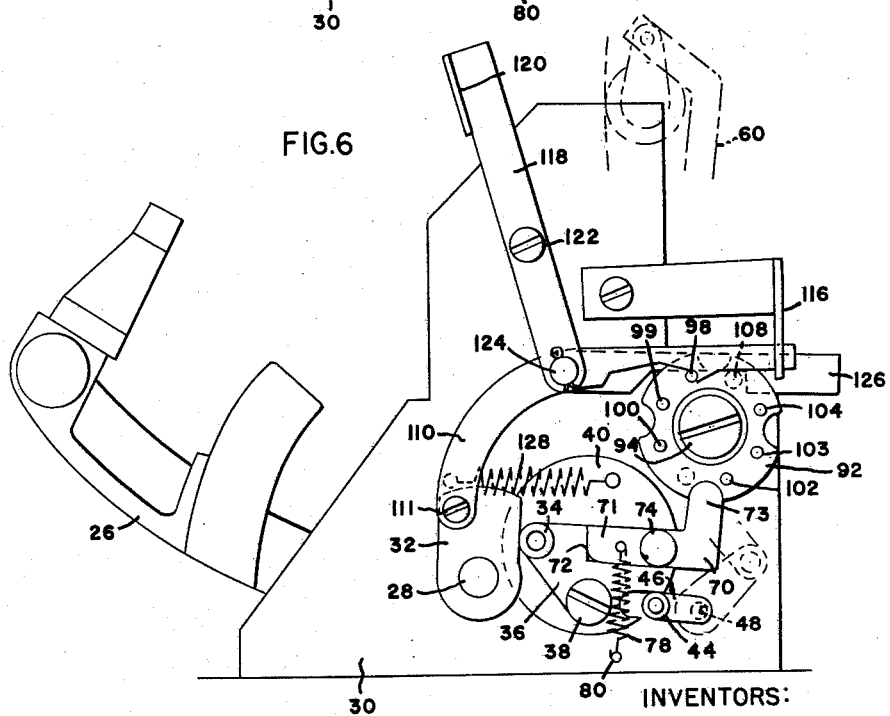

Upon return movement of the garment arm 26 from the position shown in FIGURE 5, the hook 112 on the arm 110 which has passed over the pin 98, as shown in FIGURE 5, will engage the pin 98 to partially rotate the wheel 92 to the position shown in FIGURE 6. In this position, the notch 90 in the wheel 92 is positioned to receive the outer end 82 of the leg 73 of the L-shaped arm 70, thus, permitting the spring 78 to urge the arm 70 in a counter-clockwise direction about the pivot 74 to the position shown in FIGURE 6 wherein the outer end of the leg 71 is received in the notch 72 of arm 36. This re-establishes the driving connection between the garment arm 26 and the wheel 40, as previously described, whereby upon each successive upward movement of the arm 26, the type wheel 20 is advanced one position to imprint the next tag with the next successive identification number.

The movement of the counter-actuating arm 60 for each of the operations shown and described in connection with FIGURES 3 to 6, inclusive, has been shown in dashed lines in the upper right-hand portion of each of the figures.

When the last garment of the order has been marked, it is desirable to mark the invoice 140 with a tag bearing the same identification number as the last tag affixed to the garment. To permit this, the invoice 140 is placed against the arm 118 which is depressed to move the arm 126 to the left, as viewed in FIGURE 7. The rotation of the wheel 92 through the successive positions illustrated in FIGURES 1 to 6, inclusive, has positioned the wheel 92, as shown in FIGURE 6, wherein the pin 108, which is associated with the first group of pins, 98 to 100, inclusive, is positioned for engagement by the notch 127 in the arm 126. Accordingly, when the arm 126 is moved to the left, as just described, the wheel 92 will be partially rotated in a counter-clockwise direction, as viewed in FIGURE 7, by virtue of the engagement between the notch 127 and the pin 108. This movement of the wheel 92 serves to disengage the notch 90 from the arcuate end 82 of the leg 73 on the L-shaped arm 70, thereby again disengaging the driving connection between the arm 70 and the notched arm 36. Consequently, the movement of the invoice arm 118 breaks the driving connection between the garment arm 26 and the type wheel 20 whereby a last tag 144 may be affixed to the invoice 140, which tag will have the same identification indicia imprinted thereon as the previous tag which was affixed to the last garment of the bundle, so that the invoice 140 will be provided with a pair of tags 142 and 144 having the first and last identification numbers imprinted thereon as are imprinted on the tags affixed to the first and last garments of an individual bundle.

This last movement of the wheel 92 by the arm 126, as shown in FIGURE 7, advances pin 104 into position to be engaged by the hook 112 on the return stroke of the arm 110 and the garment arm 126, thereby resetting the wheel 92 for the next bundle marking procedure, and the wheel 92 will now be advanced by virtue of the pins 104, 103, 102 and 106 in the same manner as was described in connection with pins 100, 99, 98 and 108. As will be apparent, therefore, the positioning of the pins 98 to 108, inclusive, provides the wheel 92 with two complete cycles whereby the wheel 92 will be rotated through one complete revolution by two complete invoice and garment marking operations, as described.

Referring to FIGURE 1, the housing 10 of the machine has been provided with a door 150, hinged as at 152 to an auxiliary housing 154 whereby access may be had to the mechanism comprising the subject of this invention by opening up the door 150.

What we claim is:

A garment marking machine having a garment supporting arm movable to and from a tag affixing station, print means for imprinting a tag with identification indicia for attachment to a garment, said print means including a type wheel movable through a plurality of positions to form successive identification indicia, motion transmitting means operatively connecting said garment supporting arm to said type wheel and being operable upon each movement of said arm to said tag affixing station to advance said type wheel one position, a disconnect arm mounted in juxtaposition to said tag affixing station and being normally positioned to interfere with the positioning of an invoice at said tag affixing station, said disconnect arm being movable from normal position upon placing an invoice at said tag affixing station for affixation of a tag to said invoice, and said arm being operable upon movement from normal position to disconnect said motion transmitting means from said type wheel, whereby said type wheel is not advanced upon subsequent movement of said garment arm to said tag affixing station.

References Cited in the file of this patent

UNITED STATES PATENTS

| | | |
|---|---|---|
| 2,528,740 | Carothers et al. | Nov. 7, 1950 |
| 2,588,374 | Erickson | Mar. 11, 1952 |
| 2,687,691 | Cooper et al. | Aug. 31, 1954 |
| 2,742,828 | Braun | Apr. 28, 1956 |
| 2,748,676 | Braun | June 5, 1956 |